United States Patent [19]

Paar et al.

[11] Patent Number: 4,579,932
[45] Date of Patent: Apr. 1, 1986

[54] NOVEL CATIONIC EPOXY RESIN ESTERS AND PROCESS OF PRODUCING SAME

[75] Inventors: Willibald Paar; Helmut Hönig, both of Graz, Austria

[73] Assignee: Vianova Kunstharz, A.G., Werndorf, Austria

[21] Appl. No.: 549,328

[22] Filed: Nov. 7, 1983

[30] Foreign Application Priority Data

Nov. 5, 1982 [AT] Austria .................... 4035/82

[51] Int. Cl.$^4$ .................... C08G 59/20; C08G 59/40
[52] U.S. Cl. .................... 528/114; 528/96; 528/113; 204/181.7
[58] Field of Search .................... 528/113, 114, 96

[56] References Cited

U.S. PATENT DOCUMENTS

| | | | |
|---|---|---|---|
| 4,255,553 | 3/1981 | Mizamura et al. | 528/114 |
| 4,327,200 | 4/1982 | Leitner et al. | 525/531 |
| 4,349,655 | 9/1982 | Leitner et al. | 528/45 |
| 4,431,781 | 2/1984 | Paar | 525/502 |
| 4,486,280 | 12/1984 | Hosoi et al. | 528/114 |

Primary Examiner—Herbert S. Cockeram
Attorney, Agent, or Firm—A. W. Breiner

[57] ABSTRACT

Cationic epoxy resin esters suitable as binders for stoving coating compositions, particularly for application by electrodeposition, and as mill base resins for grinding pigments and extenders; and a process for producing same is described. The resin esters are produced through reaction of a resinous compound carrying at least two 1,2-epoxy groups with carboxylic acids and, optionally, with primary and/or secondary alkyl- and-/or alkanolamines. The carboxylic acid employed, totally or partially, is the reaction product of a dicarboxylic acid anhydride and a tertiary amine which has the structure -

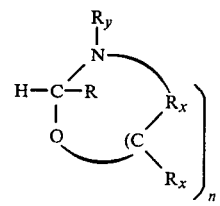

wherein R and $R_x$ are a hydrogen atom or an alkyl radical or an aryl radical which may be substituted, $R_7$ is an alkyl radical, an amino-alkyl radical having the primary amino groups, if present, blocked (as a ketimine) or the moiety remaining after the reaction with an active hydrogen atom of an acrylic or methacrylic monomer monofunctional with regard to the double bond, and wherein n is 2 or 3, the quantity of basic component being chosen in order that the epoxy-free final product has an amine value of at least 35, and preferably of from 40 to 140 mg KOH/g.

10 Claims, No Drawings

NOVEL CATIONIC EPOXY RESIN ESTERS AND PROCESS OF PRODUCING SAME

The present invention is directed to cationic epoxy resin esters containing basic amino groups and which, after protonation of their basic amino groups with inorganic or organic acids give water-dilutable paint binders, and to a process of producing the resin esters. The binders may be used to particular advantage for cathodic electrodeposition (CED). A special application is their use in pigment pastes for the formulation of CED paints.

U.S. Pat. Nos. 4,349,655 and 4,327,200 disclose CED binders carrying oxazolidine groups as protonizable groups. These groups, according to the aforesaid patents, are introduced into hydroxy group containing polymers either through urethane linkages, i.e., via a mono-adduct of an N-hydroxyalkyloxazolidine and a diisocyanate, or by means of a dicarboxylic acid semiester of an N-hydroxyalkyloxazolidine.

A number of other background documents, some of them not yet published, for example U.S. patent application Ser. No. 433,984 filed Oct. 12, 1982, now U.S. Pat. No. 4,431,781 corresponding to European Patent Application No. 00 76955, published Apr. 20, 1983; U.S. patent application Ser. No. 503,027 filed June 10, 1983; Austrian Patent Specification No. 372,689, and German Patent Application No. P 33 24 960.1 filed July 11, 1983, disclose the introduction of basic groups into the epoxy resin molecules in the form of oxazolidine groups, either totally or partially, in various ways. Thus, hydroxy group carrying oxazolidines are reacted to advantage with the epoxy groups of the epoxy resins via a carboxy group remaining free after reaction with dicarboxylic acid anhydrides. The double ester bond linking the oxazolidine radical to the epoxy resin introduces into the molecule hydrophilic and, moreover, splitable groups which, in various cases, may have a negative effect on the properties of the products and on the paint films produced therefrom.

It has now been found that hydroxy-free 5- and 6-membered ring systems carring the structure-

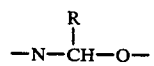

in the ring can be reacted with diacarboxylic acid anhydrides. Thus, the present invention is concerned with cationic epoxy resin esters, and a process for producing the resin esters, wherein resin-like compounds carrying at least two 1,2-epoxy groups are reacted with carboxylic acids and, optionally, with primary and/or secondary alkyl- and/or alkanolamines. The carboxylic acid employed is totally or partially the reaction product of a dicarboxylic acid anhydride and a tertiary amine which has the structure-

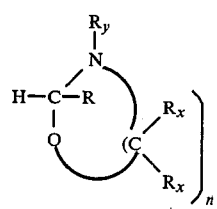

wherein R and $R_x$ are a hydrogen atom or an alkyl radical or an aryl radical which may be substituted, $R_y$ is an alkyl radical, an amino-alkyl radical having the primary amino groups, if present, blocked (as a ketimine) or the moiety remaining after the reaction with an active hydrogen atom of an acrylic or methacrylic monomer monofunctional with regard to the double bond, and wherein n is 2 or 3, the quantity of basic component being chosen in order that the epoxy-group-free final product has an amine value of at least 35 and preferably of from 40 to 140 mg KOH/g.

Suitable resinous epoxy group carrying compounds with at least two 1,2-epoxy groups, in particular, are the known epoxy resins obtained through reactions of bisphenols, novolaks, glycols, and the like, with epichlorohydrin or methylepichlorohydrin. There is a variety of the aforesaid products commercially available and which have been described in detail in publications. Products based on bisphenol A or on novolaks with an epoxide equivalent weight of from 170 to 1000 are particularly preferred. Besides these, other resins carrying epoxy groups can be employed, such as copolymers containing glycidyl(meth)acrylate.

The epoxy groups of these resin-like compounds are totally or partially reacted with carboxylic acids obtained through reaction of a dicarboxylic acid anhydride with a tertiary amine, the tertiary amine having a structure of the formula-

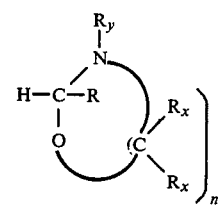

wherein the radicals R and $R_x$ stand for a hydrogen atom or an alkyl radical or an aryl radical, optionally substituted, $R_y$ is an alkyl radical, an amino-alkyl radical having the primary amino groups, if present, blocked (as a ketimine) or the moiety remaining after the reaction with an active hydrogen atom of an acrylic or methacrylic monomer monofunctional with regard to the double bond, and the index n being 2 or 3. Compounds defined by the formula are known as oxazolidines in the event n=2, i.e., 5-members in the ring, or as perhydro-1,3-oxazines in the event n-3, i.e., 6-members in the ring.

The preparation of the above N-substituted compounds particularly suited for carrying out the invention can be effected in a simple manner and according to various methods. When using N-substituted secondary ethanol- or propanolamines, the ring is closed with aldehydes, the desired ring-functional oxazolidine or perhydro-1,3-oxazine forming:

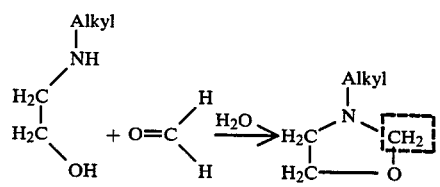

Suitable substituted amines for the reaction, in addition to N-alkyl-substituted ethanol- or propanolamines, are aminolkylsubstituted ethanol- or propanolamines, such as aminoethylethanolamine or aminoethylpropanolamine, or substances of similar structure. It is understood that primary amino groups must be present in blocked form prior to reaction, for example as ketimines. Alternatively, blocking the primary amino groups may be effected through addition of (meth)acrylic compounds to β- or γ-hydroxy-functional primary amines as follows:

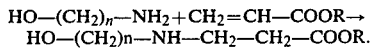
HO—(CH$_2$)$_n$—NH—CH$_2$—CH$_2$—COOR.

Further, in addition to the normal primary alkanol amines, substituted compounds such as 2-phenyl-2-hydroxy-ethylamine can be used. Suitable acrylic monomers, in addition to the homologous esters of acrylic acid or methacrylic acid with monoalcohols, are monomers carrying tertiary amino groups, such as dimethylaminoethylacrylate and its homologues.

A further method of preparing suitable secondary alkanol amines is the reaction of primary alkyl amines with monoepoxy compounds according to the reaction-

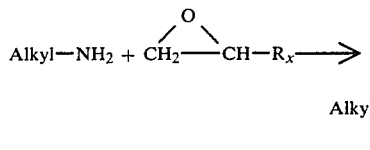

Suitable primary alkyl amines for use in forming the secondary alkanol amines are the normal straight-chain or branched alkyl amines, including the fatty amines, as well as primary/tertiary amines such as dialkylaminoalkylamines, such as dimethyl- or diethylaminopropylamine. Suitable monoepoxy compounds for use in the reaction are glycidyl esters of carboxylic acids, such as Cardura ®E (the glycidyl ester of branched C$_9$–C$_{11}$ monocarboxylic acids) or glycidylmethacrylate, glycidyl ethers, such as butylglycidyl ether, phenylglycidyl ether, p.-tertiary butylphenol glycidyl ether or allyl glycidyl ether or hydrocarbon oxides, for example the olefin oxides such as-

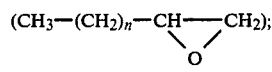

or

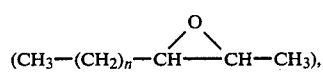

exemplified by octylene oxide, styrene oxide, or cyclohexenevinylmonoxide.

Suitable aldehydes for use in closing the ring are aliphatic or aromatic aldehydes such as formaldehyde and its homologues, benzaldehyde, anisaldehyde, and salicylaldehyde.

The methods of preparation of the various representatives of the tertiary amines used for carrying out the present invention are described in detail in the experimental section of the present specification. Blends of various types of these compounds may be produced through joint reaction of various hydroxyamines with aldehydes.

The amines are reacted with the diacarboxylic acid anhydride at from 50° to 100° C., optionally in the presence of an inert solvent, until the acid value calculated for the monocarboxy compound is attained.

Suitable dicarboxylic acid anhydrides are the saturated or unsaturated aliphatic or cycloaliphatic discarboxylic acid anhydrides and the various hydration products of aromatic discarboxylic acids. Exemplary anhydrides are the anhydrides of succinic acid and its homologues; the anhydrides of maleic acid, and the anhydrides of aromatic diacarboxylic acids such as the anhydrides of phthalic acid and naphthocarboxlic acid. Tetrahydrophthalic acid anhydride is particularly preferred. The monocarboxy compounds thus obtained are reacted at from 60° to 75° C. with the compounds carrying epoxy groups, until an acid value of below 3 mg KOH/g is attained.

The epoxy groups of the di- or polyepoxy resins not reacting with the intermediates carrying the oxazolidine groups are reacted with other modifying compounds carrying active hydrogen atoms, such as carboxylic acids or amines.

The products processed to CED binders are practically free from unreacted epoxy groups. Suitable modifying carboxylic acids are the longer chain carboxylic acids, such as saturated or unsaturated oil fatty acids; α,β-unsaturated monocarboxylic acids such as (meth)acrylic acid, or semiesters of dicarboxylic acids with saturated or unsaturated alcohols or hydroxyalkyloxazolidines or partial esters of tricarboxylic acid anhydrides. Similar modifications are described in U.S. Pat. No. 4,327,200. With simultaneous increase in the molecular weight, subordinate quantities of aliphatic dicarboxylic acids can be used. When using primary or secondary amines, the range of total amine value and the effect on the viscosity have to be considered, since otherwise the parameters for electrodeposition can be detrimentally changed.

In a particularly preferred embodiment of the process, the binders prepared according to the invention, subsequent to the reaction of the epoxy resin with the oxazolidine group carrying intermediate and the other modifiers, are subjected to an acidic hydrolysis at from 50° to 80° C., whereby, as is assumed, a part of the oxazolidine rings is opened through the formation of substituted methylol groups. Through the aforesaid post-treatment, reactions are anticipated which otherwise occur in the finished paint or in the coating tank. For this purpose, the reaction product is treated for some hours at the indicated temperature with water and a portion of the acid which is later on used for neutralization.

The binders can be milled with pigments in known manner and, for the production of a material ready for application, they are, after partial or total neutralization with inorganic or organic acids to a pH-value of from 4 to 7, diluted with preferably deionized water, to a solids content of between 5% and 20% when used for electrodeposition. The binders prepared according to the invention show excellent dilutability with water, even with a low degree of neutralization. The coemployment of additives and auxiliary substances as well as the conditions for electrodeposition are known to those skilled in the art and need no further explanation. The products produced according to the invention are particularly suited as mill base resins for grinding the pigments. The methods involved are known to the expert and form no part of the present invention.

The composition of the binders produced according to the invention by proper selection of components can have self-crosslinking properties and on baking at from 180° to 200° C. wil form homogeneous and resistant films. Self-crosslinking electrodeposition paints can be formulated with the binders of the invention which afford the properties necessary in practice such as high resistance to moisture and salt spray impact. To provide such characteristics, the binders should have a double bond number of at least 0.8, which means that they have to have at least 0.8 chain end double bonds in 1000 molecular weight units. Since the binders also carry free hydroxy groups, film-formation may also be effected through additional crosslinking agents such as blocked di- or polyisocyanates, amino resins, or phenolic resins. When using the resin as mill base for grinding the pigments, the curing tendency is sufficient to give the required resistance characteristics to the whole system when combined with other self-crosslinking resin components.

The following examples illustrate the invention without limiting its scope. All data given in parts or percentages refer to parts or percentages by weight unless otherwise stated. All data in the tables refer to the solids content.

The following abbreviations are used in the examples:
METOLA—N-methylethanolamine
ETOLA—N-ethylethanolamine
MOLA—monoethanolamine
MIPOLA—monoisopropanolamine
MPOLA—monopropanolamine
BA—n-butylamine
HA—n-hexylamine
LA—laurylamine
DMAPA—dimethylaminopropylamine
DEAPA—diethylaminopropylamine
AEEA—aminoethylethanolamine
APEA—aminopropylethanolamine
DEA—diethylamine
DBA—dibutylamine
FA—paraformaldehyde, 91%
BZA—benzaldehyde
ANA—anisaldehyde
SA—salicylaldehyde
BUAC—butylacrylate
EHAC—2-ethylhexylacrylate
EMAC—ethylmethacrylate
BUMAC—butylmethacrylate
GMAC—glycidylmethacrylate
EHGE—2-ethylhexylglycidylether
AGE—allylglycidylether
CE—Cardura E
MIBK—methylisobutylketone
APHE—acetophenone
CHX—cyclohexanone
TMSA—trimellitic acid anhydride
THPSA—tetrahydrophthalic acid anhydride
PSA—phthalic acid anhydride
MSA—maleic acid anhydride
BSA—succinic acid anhydride
GSA—glutaric acid anhydride
HHPSA—hexahydrophthalic acid anhydride
HEMA—hydroxyethylmethacrylate
HEA—hydroxyethylacrylate
MET—methanol
ETHEX—2-ethylhexanol
BUT—n-butanol
ET—ethanol
EPH I—epoxy resin based on Bisphenol A having an epoxy equivalent of about 200
EPH II—epoxy resin based or Bisphenol A having an epoxy equivalent of about 550
EPH III—epoxy resin based on an epoxidized phenol novolak having an epoxy equivalent of about 200.

Preparation Of The Intermediates Used In The Examples

1. Preparation Of Cyclic Tertiary Amines (CTA)

1.1. Through ring formation with an aldehyde of N-substituted secondary ethanol- or propanol amines, at 80° to 120° C., with azeotropic separation of the reaction water, a compound of Formula (I) resulting-

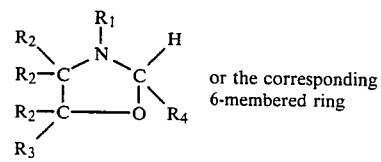

or the corresponding 6-membered ring wherein
$R_1$ is an alkyl radical with from 1 to 4 C-atoms,
$R_2$ is a hydrogen atom or a $CH_3$-group
$R_3$ is a hydrogen atom, an alkyl radical or a phenyl radical
$R_4$ is a hydrogen atom, an alkyl radical with from 1 to 12 C-atoms or an optionally substituted aryl radical.

1.2. From aminoalkyl substituted ethanol- or propanolamines, the primary amino groups of which are blocked through ketimine formation. The amine is charged to a reaction kettle, and at 30° to 60° C., the ketone is added, while the batch is cooled. Subsequently, at 80° to 120° C., the reaction water is removed by azeotropic distillation. The ring formation with the aldehyde is formed in the manner described above to provide a compound with the formula-

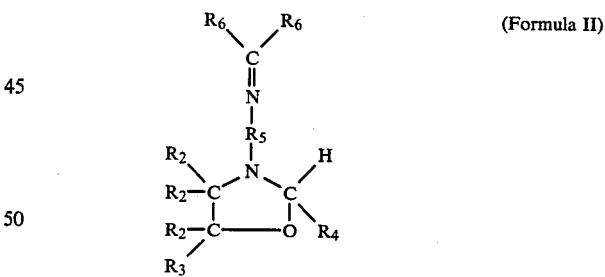

(Formula II)

wherein
$R_2$, $R_3$ and $R_4$ are as above defined, and
$R_5$ is a straight-chain or branched cyclic alkylene radical with from 2 to 12 C-atoms or an aralkyl radical, and
$R_6$ is a straight-chain or branched alkyl radical with from 1 to 4 C-atoms, an aryl radical or a hydrogen atom, or, jointly for both $R_6$ groups, a ring-forming alkylene radical optionally substituted with alkyl, aryl or alkoxy radicals.

1.3. From β- (or γ)-hydroxy functional primary amines, the primary amine groups of which have been reacted with a (meth)acrylic compound. In producing this intermediate, in the first step, the (meth)acrylate is added to the amine at 30° to 35° C., while cooling. The reaction is completed by reacting further at 70° to 80° C. or above (preferably at 140° C., in the event methacrylates are used) for a period of from 1 to 3 hours. Then, at 70° to 80° C., the aldehyde is added and the ring is closed at 80° to 120° C., while entraining the reaction water with an azeotropic agent, to provide a compound with the formula-

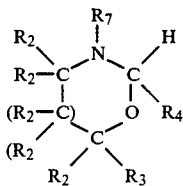

(Formula III)

wherein
  $R_2$, $R_3$ and $R_4$ are as above defined, and
  $R_7$ is a radical remaining after the reaction with an active hydrogen atom of an acrylic or methacrylic monomer monofunctional with regard to the double bond.

1.4. Through reaction with monopoxide compounds and secondary alkyl-alkanol amines derived from primary alkyl amines. Thus, the monoepoxide compound is added at 60° to 120° C. to the amine during a period of from 1 to 2 hours. The reaction is completed by maintaining the temperature for another 3 hours. The ring formation with the aldehyde in the manner above provides a 5-membered cyclic amine of the formula-

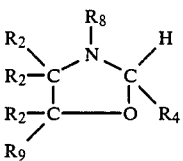

(Formula IV)

wherein
  $R_2$ and $R_4$ are as above defined, and
  $R_8$ is a straight-chain or branched alkyl radical with from 2 to 18 C-atoms, a cycloalkyl radical or an aralkyl radical or a tertiary amino group carrying the aforesaid groups, and
  $R_9$ is saturated or unsaturated aliphatic, cycloaliphatic or aromatic hydrocarbon radical, optionally carrying ether or ester groups.

Table 1 lists the starting materials (weight units) for the cyclic tertiary amines according to Formulas I to IV as used in the examples.

2. Preparation Of The Monocarboxy Compounds Used According To The Invention (MCC)

The reaction partners listed in Table 2 are reacted at the given temperature, until the calculated acid value of the monocarboxy compound is attained. Optionally, the reaction may be carried out in the presence of inert solvent such as xylene or diethylene glycol dimethylether.

3. Preparation Of The Polycarboxylic Acid Partial Esters Used As Modifiers (SE)

Semiesters or partial esters are produced from the di- and tricarboxylic acid anhydrides and monoalcohols listed in Table 3. Optionally, the reaction may be carried out in the presence of inert solvents as noted in (2) above.

EXAMPLES 1–21

Formation Of Paint Binders

The starting materials listed in Table 4 are mixed and held at 75° to 80° C., until the acid value has fallen to below 3 mg KOH/g. The reaction may optionally be carried out in the presence of solvents, such as glycol ethers, more particularly ethyleneglycol monoethylether. According to the preferred embodiment, the reaction product, obtained as a 62% to 72% solution, is diluted further with water to 60%, after addition of 10 millimoles (mM) of acetic acid per 100 g of resin solids and held at 50° to 70° C. for about 3 hours, while stirring. Prior to further processing, the binders may be diluted further with solvents such as dieactone alcohol or glycol ethers.

As will be apparent to one skilled in the art, various modifications can be made within the scope of the aforesaid description. Such modifications, being within the ability of one skilled in the art, form a part of the present invention and are embraced by the appended claims.

TABLE 1

PREPARATION OF INTERMEDIATE TERTIARY AMINES (CTA)

| CTA | Formula | Amine | (Meth)acrylate | Monoepoxide | Ketone | Reaction Temp. h/°C. | Aldehyde |
|---|---|---|---|---|---|---|---|
| 1 | I | 75 METOLA | — | — | — | — | 106 BZA |
| 2 | I | 89 ETOLA | — | — | — | — | 136 ANA |
| 3 | I | 89 ETOLA | — | — | — | — | 33 FA |
| 4 | III | 61 MOLA | 128 BUAC | — | — | 1/70 | 33 FA |
| 5 | III | 75 MIPOLA | 184 EHAC | — | — | 2/75 | 106 BZA |
| 6 | III | 61 MOLA | 114 EMAC | — | — | 2/120 | 136 ANA |
| 7 | III | 61 MOLA | 184 EHAC | — | — | 1/75 | 106 BZA |
| 8 | III | 75 MPOLA | 184 EHAC | — | — | 1/70 | 33 FA |
| 9 | III | 75 MPOLA | 142 BUMAC | — | — | 2/140 | 136 ANA |
| 10 | IV | 73 BA | — | 186 EHGE | — | 2/120 | 33 FA |
| 11 | IV | 101 HA | — | 114 AGE | — | 1/110 | 106 BZA |
| 12 | IV | 73 BA | — | 142 GMA | — | 1/100 | 136 ANA |
| 13 | IV | 102 DMAPA | — | 240 CE | — | 1/120 | 33 FA |
| 14 | IV | 130 DEAPA | — | 186 EHGE | — | 1/115 | 122 SA |
| 15 | IV | 73 BA | — | 240 CE | — | 2/130 | 106 BZA |
| 16 | IV | 188 LA | — | 114 AGE | — | 2/130 | 33 FA |
| 17 | II | 104 AEEA | — | — | 100 MIBK | — | 33 FA |
| 18 | II | 118 APEA | — | — | 120 APHE | — | 106 BZA |

TABLE 1-continued
PREPARATION OF INTERMEDIATE TERTIARY AMINES (CTA)

| CTA | Formula | Amine | (Meth)acrylate | Monoepoxide | Ketone | Reaction Temp. h/°C. | Aldehyde |
|---|---|---|---|---|---|---|---|
| 19 | II | 104 AEEA | — | — | 98 CHX | — | 136 ANA |

Column 1 represents preparations 1-19; and column 2 refers to the graphic formulations I-IV at pages 14, 15, 16, and 17 of the specification.

TABLE 2
PREPARATION OF INTERMEDIATE MONOCARBOXY COMPOUNDS (MCC)

| MCC | Dicarboxylic Anhydr. | Cycl. Tert. Amine Table 1 | Reaction Temp. °C. |
|---|---|---|---|
| 1 | 114 GSA | 101 VP 3 | 80 |
| 2 | 98 MSA | 347 VP 5 | 60 |
| 3 | 152 THPSA | 271 VP 8 | 85 |
| 4 | 148 PSA | 354 VP 13 | 70 |
| 5 | 100 BSA | 333 VP 7 | 80 |
| 6 | 154 HHPSA | 207 VP 2 | 90 |
| 7 | 98 MSA | 401 VP 15 | 65 |
| 8 | 148 PSA | 302 VP 19 | 70 |
| 9 | 152 THPSA | 271 VP 10 | 85 |
| 10 | 114 GSA | 198 VP 17 | 75 |
| 11 | 148 PSA | 335 VP 9 | 90 |
| 12 | 98 MSA | 293 VP 6 | 65 |
| 13 | 100 BSA | 420 VP 14 | 65 |
| 14 | 152 THPSA | 163 VP 1 | 70 |
| 15 | 148 PSA | 308 VP 18 | 75 |
| 16 | 100 BSA | 201 VP 4 | 75 |
| 17 | 114 GSA | 303 VP 11 | 80 |
| 18 | 148 PSA | 333 VP 12 | 75 |
| 19 | 152 THPSA | 198 VP 17 | 75 |
| 20 | 98 MSA | 101 VP 4 167 VP 7 | 60 |
| 21 | 100 BSA | 157 VP 16 82 VP 1 | 85 |

TABLE 3
PREPARATION OF INTERMEDIATE PARTIAL ESTER MODIFIERS (SE)

| SE | Carboxylic Anhydride | Monoalcohol | Reaction Temp. °C. |
|---|---|---|---|
| 1 | 98 MSA | 130 HEMA | 85 |
| 2 | 148 PSA | 32 MET | 70 |
| 3 | 152 THPSA | 116 HEA | 85 |
| 4 | 58 TMSA 106 PSA | 130 ETHEX | 100 |
| 5 | 100 BSA | 130 HEMA | 85 |
| 6 | 98 MSA | 65 ETHEX 37 BUT | 95 |
| 7 | 152 TMPSA | 32 MET | 75 |
| 8 | 148 PSA | 74 BUT | 95 |
| 9 | 98 MSA | 116 HEA | 85 |
| 10 | 100 BSA | 46 ET | 80 |

TABLE 4
EXAMPLES OF BINDER PREPARATIONS

| Example | Epoxy Resin g/Type | Epoxy Resin Val | MCC g/Type | MCC Mol | SE or Monocarboxylic Acid g/Type | SE or Monocarboxylic Acid Val | Amine g | Amine Val | Amine mg KOH/g |
|---|---|---|---|---|---|---|---|---|---|
| 1 | 400 I 500 II | 2.0 1.0 | 542/17 | 1.3 | 144/2 | 0.8 | 22 DEA 31 DMAPA | 0.3 0.6 | 75 |
| 2 | 532 III | 2.8 | 482/16 | 1.6 | 257/9 | 1.2 | — | — | 70 |
| 3 | 200 I 500 II 190 III | 1.0 1.0 1.0 | 280/19 | 0.8 | 138/MACS | 1.6 | 44 DEA | 0.6 | 91 |
| 4 | 500 II 342 III | 1.0 1.8 | 898/7 | 1.8 | — | — | 29 DEA 39 DEAPA | 0.4 0.6 | 87 |
| 5 | 600 I | 3.0 | 866/5 | 2.0 | — | — | 73 DEA | 1.0 | 109 |
| 6 | 300 I 650 III | 1.5 1.3 | 676/13 | 1.3 | 402/3 | 1.5 | — | — | 72 |
| 7 | 1200 II | 2.4 | 254/9 | 0.6 | 86/MACS | 1.0 | 103 DBA | 0.8 | 48 |
| 8 | 300 I 228 III | 1.5 1.2 | 407/21 | 1.2 | 115/5 | 0.5 | 44 DEA 20 DMAPA | 0.6 0.4 | 111 |
| 9 | 1050 II | 2.1 | 757/2 | 1.7 | — | — | 29 DEA | 0.4 | 64 |
| 10 | 456 III | 2.4 | 483/11 | 1.0 | 120/6 | 0.6 | 41 DMAPA | 0.8 | 92 |
| 11 | 260 I 247 III | 1.3 1.3 | 274/12 | 0.7 | 146/10 | 1.0 | 39 DBA 31 DMAPA | 0.3 0.6 | 90 |
| 12 | 440 I 400 II | 2.2 0.8 | 592/3 | 1.4 | 222/8 | 1.0 | 39 DEAPA | 0.6 | 66 |
| 13 | 560 I | 2.8 | 593/15 | 1.3 | 300/6 | 1.5 | — | — | 100 |
| 14 | 1100 II | 2.2 | 337/18 | 0.7 | 129/7 | 0.7 | 15 DEA 39 DEAPA | 0.2 0.6 | 52 |
| 15 | 475 III | 2.5 | 406/10 | 1.3 | 86/ACS | 1.2 | — | — | 151 |

It is claimed:

1. Cationic epoxy resin esters obtained by the reaction of a compound carrying at least two 1,2-epoxy groups with a carboxylic acid, said carboxylic acid being the reaction product of a dicarboxylic acid anhydride and a tertiary amine, said amine having the structure-

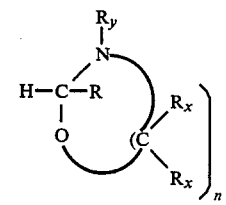

wherein R and $R_x$ are a hydrogen atom; an alkyl radical or an aryl radical and n is 2 or 3, and $R_y$ is an alkyl radical, an amino-alkyl radical having the primary amino groups, if present, being in the form of ketimine blocked amino groups, and said tertiary amine being obtained through ring formation with an aldehyde, water being split off, from at least one member of the group- (a) an N-substituted ethanolamine or N-substituted propanolamine;

(b) primary $\beta$-hydroxyethylamines or $\beta$-hydroxypropylamines or $\gamma$-hydroxyethylamines or $\gamma$-hydroxypropylamines, or a substituted derivative of said amines, after blocking the primary amino group as a ketimine or through reaction with acrylate monomers, and (c) reaction product of a primary alkyl amine with a monoepoxy compound;

the quantity of tertiary amine being such that the epoxy resin ester is at least substantially free of epoxy groups and has an amine value of at least 35 mg KOH/g.

2. The cationic epoxy resin esters of claim 1 wherein said reaction product of epoxy group containing compound and carboxylic acid further includes a primary or secondary alkyl or alkanol amine.

3. The cationic epoxy resin esters of claim 1 wherein said epoxy resin ester has an amine value of from about 40 to 140 mg KOH/g.

4. The cationic epoxy resin esters of claim 1 wherein the components of said ester are selected to provide an ester containing a minimum of 0.8 chain end double bonds in 1000 molecular weight units to provide a self-crosslinking binder.

5. A process for producing cationic epoxy resin esters comprising the steps of reacting a resinous compound carrying at least two 1,2-epoxy groups with a carboxylic acid characterized in that said carboxylic acid is a reaction product of a dicarboxylic acid anhydride and a tertiary amine having the structure-

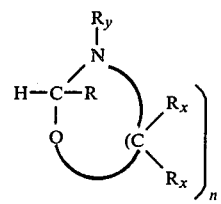

wherein R and $R_x$ are a hydrogen atom; an alkyl radical or an aryl radical, and n is 2 or 3, and $R_y$ is an alkyl radical, an amino-alkyl radical having the primary amino groups, if present, being in the form of ketimine blocked amino groups, and said tertiary amine being obtained through ring formation with an aldehyde, water being split off, from at least one member of the group- (a) an N-substituted ethanolamine of N-substituted propanolamine;

(b) primary $\beta$-hydroxyethylamines or $\beta$-hydroxypropylamines or $\gamma$-hydroxyethylamines or $\gamma$-hydroxypropylamines, or a substituted derivative of said amines, after blocking the primary amino group as a ketimine or through reaction with acrylate monomers, and (c) reaction product of a primary alkyl amine with a monoepoxy compound;

the quantity of tertiary amine being such that the esters are at least substantially free of epoxy groups and have an amine value of at least 35 mg KOH/g.

6. Process according to claim 5 wherein said reaction is carried out at 60° to 75° C., the carboxylic acid being reacted with the epoxy compound to an acid value of below 3 mg KOH/g.

7. Process according to claim 5 including the step of treating said epoxy resin esters with water for several hours at 50° to 80° C. in the presence of 10 millimoles of said per 100 g of resin solids.

8. Process according to claim 5 wherein the reaction of the dicarboxylic acid anhydride with the tertiary amines is carried out at from 50° to 100° C.

9. The process of claim 5 further including the step of modifying the reaction product of epoxy containing compound and carboxylic acid with a primary or secondary alkyl or alkanolamine.

10. The process of claim 8 wherein said amine value is from about 40 to 140 mg KOH/g.

* * * * *